US007562156B2

(12) United States Patent
Phadke

(10) Patent No.: US 7,562,156 B2
(45) Date of Patent: Jul. 14, 2009

(54) SYSTEM AND METHOD FOR DECODING COMMUNICATIONS BETWEEN NODES OF A CLUSTER SERVER

(75) Inventor: Abhay N. Phadke, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 1357 days.

(21) Appl. No.: 10/222,104

(22) Filed: Aug. 16, 2002

(65) Prior Publication Data

US 2004/0034703 A1    Feb. 19, 2004

(51) Int. Cl.
G06F 15/16    (2006.01)
(52) U.S. Cl. .......................... 709/246; 709/230
(58) Field of Classification Search .......... 709/224, 709/230, 246; 726/23, 25
See application file for complete search history.

(56) References Cited

U.S. PATENT DOCUMENTS

| | | | | |
|---|---|---|---|---|
| 5,351,243 A * | 9/1994 | Kalkunte et al. | ............. | 370/475 |
| 5,613,096 A * | 3/1997 | Danknick | ............. | 709/236 |
| 5,787,253 A * | 7/1998 | McCreery et al. | ............. | 709/231 |
| 5,916,305 A * | 6/1999 | Sikdar et al. | ............. | 709/236 |
| 6,026,442 A | 2/2000 | Lewis et al. | ............. | 709/229 |
| 6,044,401 A * | 3/2000 | Harvey | ............. | 709/225 |
| 6,266,700 B1 | 7/2001 | Baker et al. | | |
| 6,301,668 B1 * | 10/2001 | Gleichauf et al. | ............. | 726/25 |
| 6,377,998 B2 * | 4/2002 | Noll et al. | ............. | 709/236 |
| 6,401,120 B1 | 6/2002 | Gamanche et al. | ............. | 709/226 |
| 6,493,761 B1 * | 12/2002 | Baker et al. | ............. | 709/230 |
| 6,523,108 B1 * | 2/2003 | James et al. | ............. | 712/224 |
| 6,587,910 B2 * | 7/2003 | Smyers et al. | ............. | 710/306 |
| 6,651,099 B1 * | 11/2003 | Dietz et al. | ............. | 709/224 |
| 6,665,725 B1 * | 12/2003 | Dietz et al. | ............. | 709/230 |
| 6,717,943 B1 * | 4/2004 | Schwering | ............. | 370/389 |
| 6,728,909 B1 * | 4/2004 | Bunton et al. | ............. | 714/49 |
| 6,771,646 B1 * | 8/2004 | Sarkissian et al. | ............. | 370/392 |
| 6,789,116 B1 * | 9/2004 | Sarkissian et al. | ............. | 709/224 |

(Continued)

FOREIGN PATENT DOCUMENTS

| | | |
|---|---|---|
| EP | 0332286 A2 | 9/1989 |
| EP | 0474932 A1 | 3/1992 |
| WO | 98/11702 | 3/1998 |

OTHER PUBLICATIONS

WWW.SYNGRESS.COM, "Detecting and Performing Security Breaches with Sniffer Pro", Chapter 11, pp. 513-565.*

(Continued)

*Primary Examiner*—Douglas B Blair
(74) *Attorney, Agent, or Firm*—Meyertons Hood Kivlin Kowert & Goetzel, P.C.; B. Noël Kivlin

(57) ABSTRACT

A table-based packet sniffing/decoding system and method suitable for cluster server systems is provided. Packets having portions of various protocols are communicated between nodes of a cluster server. Fields of the packets are decoded using protocol definition tables and may be stored for subsequent analysis. A protocol is identified from a protocol identification field of a packet and the field definition table is identified for the identified protocol. The field definition table defines fields of packets for a particular protocol and identifies a field decode handler for use in decoding each field. A filter may be applied to selectively decode (or refrain from decoding) certain fields. A filter may also be applied to selectively decode particular protocols.

20 Claims, 5 Drawing Sheets

U.S. PATENT DOCUMENTS

| | | | |
|---|---|---|---|
| 6,874,089 B2* | 3/2005 | Dick et al. | 726/14 |
| 6,930,978 B2* | 8/2005 | Sharp et al. | 370/229 |
| 6,944,670 B2* | 9/2005 | Krichevski et al. | 709/230 |
| 6,944,673 B2* | 9/2005 | Malan et al. | 709/237 |
| 6,968,359 B1* | 11/2005 | Miller et al. | 709/205 |
| 7,013,482 B1* | 3/2006 | Krumel | 726/13 |
| 7,017,186 B2* | 3/2006 | Day | 726/23 |
| RE39,116 E* | 6/2006 | Shirani et al. | 370/465 |
| 7,272,662 B2* | 9/2007 | Chesnais et al. | 709/246 |
| 2002/0156886 A1* | 10/2002 | Krieski et al. | 709/224 |
| 2002/0186705 A1* | 12/2002 | Kadambi et al. | 370/452 |
| 2003/0135758 A1* | 7/2003 | Turner | 713/201 |
| 2003/0174711 A1* | 9/2003 | Shankar | 370/395.53 |
| 2005/0226195 A1* | 10/2005 | Paris et al. | 370/338 |
| 2009/0003213 A1* | 1/2009 | Tzeng | 370/235 |

OTHER PUBLICATIONS

Richard Sharpe, "Table-Driven Packet Dissection?", Ethereal-Dev., Online, www.ethereal.com/lists/ethereal-dev/199902/msg00008.html, Feb. 8, 1999, pp. 1-2 XP002267691, retrieved Jan. 22, 2004, 2 pgs.

Guy Harris, "Table-Driven Packet Dissection?", Ethereal-Dev., Online, www.ethereal.com/lists/ethereal-dev/199902/msg00010.htttml, Feb. 7, 1999, pp. 1-2 XP002269167, retrieved Jan. 22, 2004, 2 pgs.

Prufer, R.J., "Network Advisor Protocol Analysis: Decodes", Hewlett-Packard Journal, vol. 43, No. 5, Oct. 1, 1992, pp. 34-40, XP000349772.

International Search Report, PCT/US 03/25620, mailed Mar. 12, 2004.

* cited by examiner

FIG. 5

| NAME | PARENT | UNIQUE QUALIFIER | DEFINITION TABLE |
|---|---|---|---|
| LLT | NULL | 12, 2, 0xCAFE | LLT_DTBL |
| GAB | LLT | {3, 1, 0x05} LLT DATA | GAB_DTBL |
| HAD | GAB | {44, 1, 0x68} LLT DATA | HAD_DTBL |
| LMX | LLT | {3, 1, 0x0A} LLT_LMX | LMX_DTBL |
| . . . | | | |

| NAME | NUMBER OF FIELDS | FIELD DEFINITION TABLE |
|---|---|---|
| LLT | 15 | LLT_FLD_TBL |
| GAB | | GAB_FLD_TBL |
| HAD | | HAD_FLD_TBL |
| LMX | | LMX_FLD_TBL |

| FIELD NAME | SIZE | OFFSET | TYPE | F VALIDATE () | F DECODE () |
|---|---|---|---|---|---|
| MAJOR VERSION | 1 | 0 | INTEGER | LLT_FVAL1 () | LLT_DFLD1 () |
| MINOR VERSION | 1 | 1 | INTEGER | LLT_FVAL2 () | LLT_DFLD2 () |
| CLUSTER NUMBER | 1 | 2 | INTEGER | LLT_FVAL3 () | LLT_DFLD3 () |
| PACKET TYPE | 1 | 3 | INTEGER | LLT_FVAL4 () | LLT_DFLD4 () |
| DEST NID | 2 | 4 | INTEGER | LLT_FVAL5 () | LLT_DFLD5 () |
| SRC NID | 2 | 6 | INTEGER | LLT_FVAL6 () | LLT_DFLD6 () |
| PORT | 2 | 8 | INTEGER | LLT_FVAL7 () | LLT_DFLD7 () |
| FLAGS | 1 | 10 | INTEGER | LLT_FVAL8 () | LLT_DFLD8 () |
| PADDING | 1 | 11 | INTEGER | LLT_FVAL9 () | LLT_DFLD9 () |
| LENGTH | 2 | 12 | INTEGER | LLT_FVAL10 () | LLT_DFLD10 () |
| DEST GEN NUM | 4 | 14 | INTEGER | LLT_FVAL11 () | LLT_DFLD11 () |
| READY | 2 | 18 | INTEGER | LLT_FVAL12 () | LLT_DFLD12 () |
| SEQUENCE NUM | 4 | 20 | INTEGER | LLT_FVAL13 () | LLT_DFLD13 () |
| ACK SEQUENCE | 4 | 24 | INTEGER | LLT_FVAL14 () | LLT_DFLD14 () |
| SRC GEN NUM | 4 | 28 | INTEGER | LLT_FVAL15 () | LLT_DFLD15 () |

(700, 702, 704, 706, 708, 710, 712)

SYSTEM AND METHOD FOR DECODING COMMUNICATIONS BETWEEN NODES OF A CLUSTER SERVER

TECHNICAL FIELD

The present invention pertains to electronic communications, and in particular, to communications between nodes of a network, and more particularly to decoding packets communicated between nodes of a cluster server.

BACKGROUND

A cluster server is generally a group of at least two server nodes connected by an internal network and utilized as a single server system over an external network. The clustering of server nodes provides a number of benefits over independent servers. One important benefit is that cluster software, which is run on each of the servers in a cluster, automatically detects application failures or the failure of another server in the cluster. Upon detection of such failures, failed applications may be terminated and reinstated on a surviving node. Other benefits of cluster servers include the ability for administrators to inspect the status of cluster resources and accordingly balance workloads among different nodes of the cluster to help improve performance. Such manageability also provides administrators with the ability to update one node of a cluster server without taking important data and applications offline for the duration of the maintenance activity. As can be appreciated, cluster servers are used in many critical database management, file and intranet data sharing, messaging, and general business applications.

In a conventional cluster server system, the cluster operational data (i.e., state) of a prior incarnation of the system is known to the subsequent incarnation of the cluster to help prevent loss of critical data. For example, if a client's transaction data are recorded in one node of the cluster server, but a new node of the cluster server starts up without the previous cluster server's operational data, the client's transactions may be lost. To avoid this, each node of a cluster server system may possesses its own replica of the cluster operational data to ensure that at least one node in any given set of nodes in a cluster server was common to any previous cluster configuration so that the cluster had at least one copy of the correct cluster operational data.

One problem with conventional cluster server systems is that problems with the communications between individual server nodes are difficult to analyze. For example, nodes of a cluster server may communicate therebetween with packets configured in accordance with one or more protocols, which may be constantly changing as systems are upgraded. Conventional packet sniffers, packet decoders and packet analyzers are typically hard-coded to analyze packets of a single predetermined protocol. Such hard-coded elements are generally not suitable for decoding packets communicated between nodes of a cluster server. In addition, conventional packet sniffers and decoders are unable to selectively decode various protocols and fields of packets of various protocols, thereby making analysis of the data very difficult.

Thus there is a general need for a method and system that decodes communications between nodes of a network. There is also a general need for a method and system that decodes communications of various protocols of packets communicated between nodes of a cluster server. There is also a general need for a method and system that helps customers analyze problems with cluster server operation. There is also a general need for a method and system that may serve as a training tool to help persons understand various protocol communications between nodes communicating over a network. There is also a general need for a method and system that decodes communications of various protocols communicated between nodes of a cluster server without additional loading of the nodes of the cluster server.

SUMMARY OF THE INVENTION

The present invention provides a table-based packet sniffing/decoding system and method suitable for networked systems including cluster server systems. In one embodiment, packets having portions of various protocols are communicated between nodes of a cluster server. Fields of the packets are decoded using protocol definition tables and may be stored for subsequent analysis. Each packet may be comprised of several portions configured in accordance with a particular protocol. A protocol is identified from a protocol identification field of a protocol portion of a packet and a protocol identification table may be used to determine if the protocol has been defined for subsequent decoding. A field identification table may be used to determine the number of fields of the protocol and to identify a location of a field definition table for the protocol. The field definition table defines parameters of fields of protocol portions of a packet for a particular protocol. The field definition table may also identify a field decode handler for use in decoding each field. Each field of the protocol portion of the packet may then be individually decoded with the identified decode handler. The process may be repeated for other protocol portions of the packet that are configured in accordance with other protocols.

In one embodiment, a filter may be applied to selectively decode (or refrain from decoding) certain fields. A filter may also be applied to selectively decode particular protocols. The decoded fields may be stored in an output file for subsequent analysis. Additional protocol definition tables are easily added for decoding packets of other protocols.

Embodiments of the present invention also include a packet decoding system to decode packets communicated between nodes of a cluster server. Embodiments of the present invention may be implemented by a computing platform. Embodiments of the present invention also include an article comprising a storage medium having stored thereon instructions, that when executed by a computing platform, decode packets communicated between nodes of a cluster server.

BRIEF DESCRIPTION OF THE DRAWINGS

The appended claims are directed to some of the various embodiments of the present invention. However, the detailed description presents a more complete understanding of the present invention when considered in connection with the figures, wherein like reference numbers refer to similar items throughout the figures and:

FIG. 5 is an example of a protocol identification table in accordance with an embodiment of the present invention;

FIG. 6 is an example of a field identification table in accordance with an embodiment of the present invention; and FIG. 7 is an example of a field definition table in accordance with an embodiment of the present invention.

DETAILED DESCRIPTION

The following description and the drawings illustrate specific embodiments of the invention sufficiently to denable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

The present invention provides, among other things, a method and system that decodes communications between nodes of a network. In another embodiment, the present invention provides a method and system that decodes communications of various protocols of packets communicated between nodes of a cluster server. In yet another embodiment, the present invention provides a method and system that helps customers analyze problems with cluster server operation. In yet another embodiment, the present invention provides a method and system that may serve as a training tool to help persons understand various protocol communications between nodes communicating over a network. In another embodiment, the present invention provides a method and system that decodes communications of various protocols communicated between nodes of a cluster server without additional loading of the nodes of the cluster server.

Figure 1:
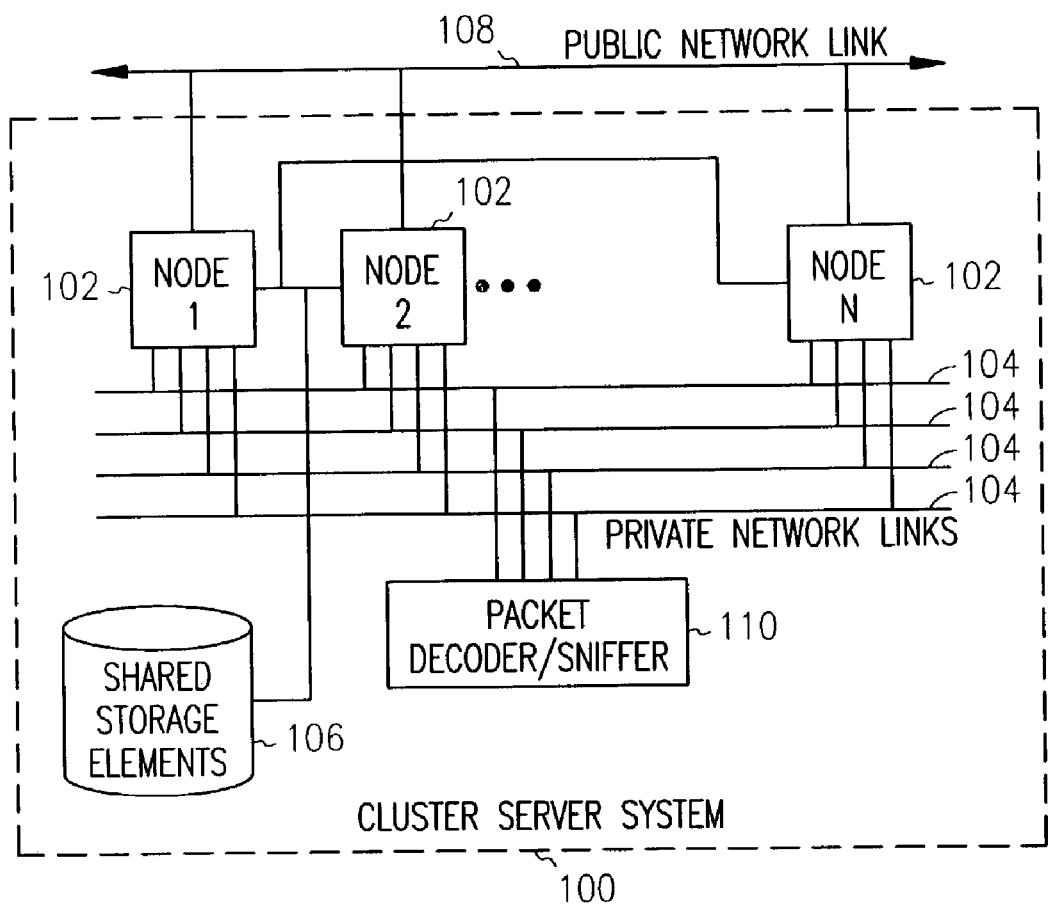
FIG. 1 is a functional block diagram of a cluster server system in accordance with an embodiment of the present invention.

FIG. 1 is a functional block diagram of a cluster server system in accordance with an embodiment of the present invention. Cluster server system 100 includes one or more nodes 102 that operate together and function as a single server system. Nodes 102 communicate over one or more private links 104, which are internal to system 100. Nodes 102 may also share one or more common storage elements, such as shared storage elements 106. Client workstations may access and utilize services provided by system 100 over public network link 108, which is generally not considered part of system 100.

System 100 may run a replicated state on each node 102 of the cluster. Private network links 104 allow nodes 102 to share identical state information and to recognize which systems are active, which are joining or leaving the cluster and which may have failed. Private network links 104 may provide at least two communication channels to guard against network partitions.

Multiple channels (e.g., I/O channels) may be used to connect nodes 102 to shared storage elements 106 which may provide an access path to the same data allowing nodes 102 to restart applications on alternate nodes 102 to help ensure high availability. Although system 100 illustrates shared storage elements 106 in a fully shared storage arrangement, shared storage elements 106 may also be configured in distributed shared storage arrangement (not illustrated).

Nodes 102 may be any computing platform or computing system and may be configured to operate in a clustered server environment described herein. Nodes 102 may communicate with each other by "heartbeats" over private links 104. Nodes 102 may also run various protocols to configure packets in accordance with one or more of the protocols for communications therebetween over the private network.

In accordance with embodiments of the present invention, packet decoder/sniffer 110 may decode packets communicated between nodes 102 over links 104 and may store decoded portions of packets for subsequent analysis. Examples of protocols utilized by nodes 102 may include a Group Atomic Broadcast (GAB) protocol and a Low Latency Transport (LLT) protocol. In some embodiments, protocols running above LLT may include the GAB protocol, a LLT multi-plexor (LMX) protocol, High Availability Engine (HAD) protocol, and a Clustered Volume Manager (CVM) protocol, among others. Embodiments of the present invention, however, may be suitable for decoding packets of any protocol. Packet decoder/sniffer 110 may be any computing platform or computing system and may utilize protocol definition tables to analyze and decode packets. This is described in more detail below. Embodiments of the present invention may decode packets configured in accordance with many protocols. Examples of other protocols that may be decoded by embodiments of the present invention include at least UDP packets and TCP/IP packets.

In one embodiment, nodes 102 may include modules for running the protocols. For example, in this embodiment, an LLT module may run an LLT protocol and communicate LLT protocol packets for providing fast, kernel-to-kernel communications between nodes 102. The LLT module may also monitor network connections and may help provide a reliable transport layer. In one embodiment, a GAB module may run the GAB protocol, may provide for group membership and atomic broadcast, and may provide a global message order for maintaining a synchronized state among nodes 102. The GAB module may also monitor disc communications. GAB may also monitor heartbeat communications between nodes 102 which may be sent periodically to verify that the nodes are active.

In one embodiment, the LLT protocol may run directly on top of a data link protocol interface (DLPI) layer on a UNIX system, or a network driver interface specification (NDIS) on a Windows NT system. This may help ensure that events such as state changes may be reflected quickly.

Although packet decoder/sniffer 110 is illustrated as being coupled to links 104, in other embodiments of the present invention, packet decoder/sniffer 110 may be coupled with one or more public network links, such as link 108 for decoding packets thereon.

Figure 2:
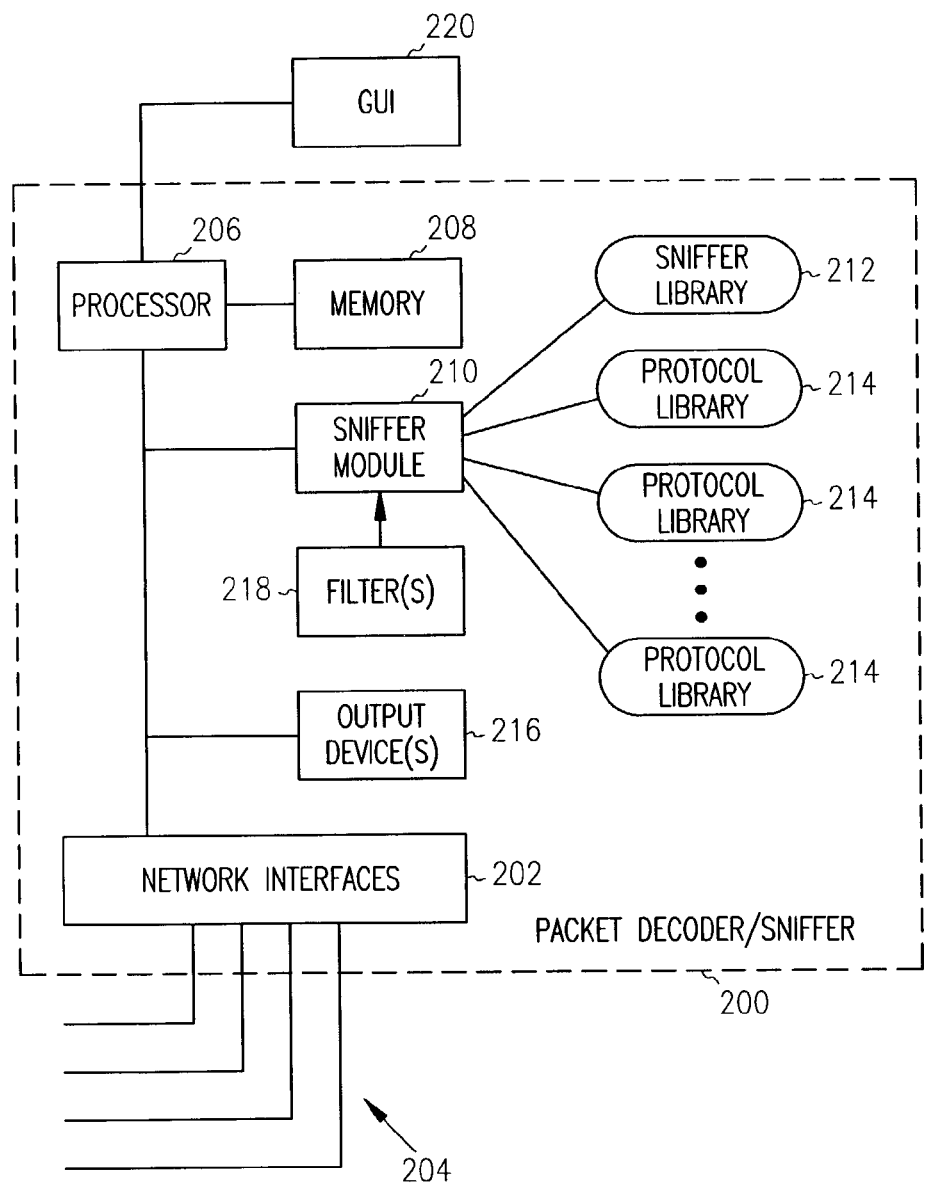
FIG. 2 is a functional block diagram of a packet decoder/sniffer element in accordance with an embodiment of the present invention.

FIG. 2 is a functional block diagram of a packet decoder/sniffer element in accordance with an embodiment of the present invention. Packet decoder/sniffer element 200 is suitable for use as packet decoder/sniffer 110 (FIG. 1) although other systems may also be suitable. Although system 200 is illustrated as having several separate functional elements, one or more of the functional elements may be combined and may be implemented by combinations of software-configured elements, such as processors including digital signal processors (DSPs) and/or other hardware elements. System 200 includes one or more network interfaces 202 to read and/or receive packets communicated over network links 204, which may correspond with private network link 104 (FIG. 1). System 200 may also include elements of a standard computing platform, some of which may not be illustrated, including processor 206 and memory 208 for performing the various operations described herein. Although system 200 is described for decoding packets communicated in a cluster server system, embodiments of the present invention may be equally suitable for decoding packets communicated over any network, including IP packets communicated over the Internet.

In several embodiments, sniffer module 210 may be configured to decode packets of one or more of various protocols received at network interface 202. In one embodiment, sniffer module 210 may be an executable program element and may utilize sniffer library element 212 and a plurality of protocol library elements 214 for decoding packets, and may provide decoded packets to output device 216. Output device 216 may be any output device, such as a file or storage element suitable for storing digital information. Output device 216 may also be a printer or communication device.

In one embodiment, a generic protocol definition table based approach may be used to analyze protocol packets (e.g., LLT packets) and to decode the packets, with their respective payload information, of the protocols running above LLT such as: GAB packets, LMX packets, HAD packets, CVM packets etc. In one embodiment, users are provided an extensible framework to define additional protocols (e.g., above LLT) for which detail decoding may be supported. This framework may also support detail decoding for LLT clients such as LMX/CFS/GLM, etc.

In one embodiment, the framework may provide a static 'C' library (which may be on the same platform as system 200) for developers for enabling new protocols being analyzed (e.g., above LLT). There are a set of libraries available: one library may have a common framework (e.g., vcs shiffer.lib) and one library per protocol may have the entire logic of how to analyze that particular protocol (e.g., llt.lib, gab.lib, had.lib, new_protocol.lib, etc.). This framework may provide a mechanism to add a new user defined protocol above LLT or any other protocol above LLT (such as GAB or LMX) by providing, for example, the following information:

1. Name of the new protocol.
2. Name of its parent protocol.
3. Unique Qualifier that may identify/determine this protocol from its parent protocol.
4. Definition of the protocol.

In one embodiment, a new protocol may be defined by providing, for example, the following information:

1. Total number of fields in the protocol.
2. Definition of each field in the protocol.

The fields of a protocol may be defined by providing, for example, following information:

1. Name of the field.
2. Size of the field. If the size is fixed, it may be provided in bytes. If the size is variable, the size may be implicit in some another field and a function pointer may point to function returning size in bytes.
3. Offset of the field.
4. Type of the field: String, Integer, Boolean, Other.
5. The function pointer pointing to how to validate the field.
6. The function pointer pointing to how to decode the field in a string buffer.

In one embodiment, sniffer library 212 (vcs_sniffer.lib) may provide some validation functions, such as:

Validate integer (value, minimum, maximum), where minimum and maximum is range. This function may return TRUE if ((value >=minimum) && (value <=maximum)), otherwise, the function may return FALSE.

Validate_alphanumeric (value). This function may return TRUE if value contains only alphanumeric characters; otherwise, the function may return FALSE.

Validate_enumerated (value, set of values). This function may return TRUE if value is part of a given set; otherwise, the function may return FALSE.

The sniffer library may also provide some decode functions such as:

Decode_char—decodes a single character (e.g. gab port id: 0x07 source nid: 0x01)

Decode_interger_dec—decodes an integer in decimal format (e.g. payload size: 180)

Decode_integer_hex—decodes an integer in hexa-decimal format (e.g. conn seq no: 0xb73a0002 bcast seq no: 0x00000082)

Decode_string—decodes as a string of null-terminated characters (e.g. vlist: "group_1")

Decode_enumerated—decodes as a string from enumerated set of valid values (e.g. message type: (BROADCAST) 1 channel: IPM_CHN_IPM (1))

The use of validation and decode functions of the sniffer library 212 may be selectable by a user. If the user does not want to use any validation/decode functions provided by library 212, the user may have his or her own validation/decode functions provided through individual protocol library, such as one of libraries 214.

In one embodiment, the unique qualifier used to identify a protocol may be a unique protocol qualifier that identifies a protocol from its parent protocol. In this embodiment, the unique protocol qualifier may be a combination of given number of bytes at given offset with a given value (i.e. {offset, size, value} combination).

In one embodiment, system 200 may include filtering elements 218 which may provide a filtering mechanism to filter out undesired traffic seen on private links 204. Filtering elements 218 may operate in two modes to provide pre-capture filtering (e.g., at the time of capture) and post capture filtering (e.g., during decoding). Filtering elements 218 may filter out undesired traffic based on clusterid, private link #, and/or type of traffic (GAB, HAD, etc.). Filtering elements 218 may also filter by matching specified fields in a message. For example, filtering elements may filter based on a specified message type in HAD, a specified channel in HAD, or, for example, a specified sender. Filtering elements 218 may also provide filter based matching with specified data at specified offset (e.g., if it matches 3-bytes @offset 60, a string "xyz"; or, if it matches 4-bytes @offset 75, binary data {0x01, 0x0f, 0xcc, 0xdd}).

Filtering elements 218 may also capture packets on some or all private links 20.4 and store the captured packets in a binary file which may be then taken offline and be used for further detail decode analysis. In one embodiment, the size (i.e., in MB) of this capture file may be user definable and may wrap-around when it is full so that the packets during last few hours are captured and are available for further analysis. Filtering elements 218 may also provide a detail-decoding feature that can decode LLT/GAB/HAD (or any client of LLT) messages in detail. In one embodiment, in every captured packet, all the fields of respective protocols may be decoded along with additional packet information such as a timestamp of capture, packet number, link number, a size of the packet, and the packet data.

In an optional embodiment, for pre-capture filters, a user may define 'start capture trigger condition' to start capturing of packets on occurrence of the specified condition and 'stop capture trigger condition' to stop capturing of packets on occurrence of the specified condition. In one embodiment, after post-capture filtering, an export facility may be available that allows copying the matching packets in the buffer into a user specified binary file.

In one embodiment, system 200 may provide graphical user interface 220 (GUI) allowing a user to define pre and post capture filters, to start and stop capturing, to export the buffer data into a user specified binary file, and to decode protocols in various formats such as summary, raw, detail decode, etc.

GUI 220 may run on system 200 as well as on any other client machine using an exported buffer.

In one embodiment, system 200 may include one or more decode handlers to decode fields of a particular protocol packet. The one or more decode handlers may be comprised of software and may be part of sniffer module 210. Alternatively, the decode handlers may be hard coded in hardware. In one embodiment, a separate decode handler may be provided for each field that sniffer module 210 is configured to decode and may be defined in a protocol library 214 associated with the protocol.

Figure 3:
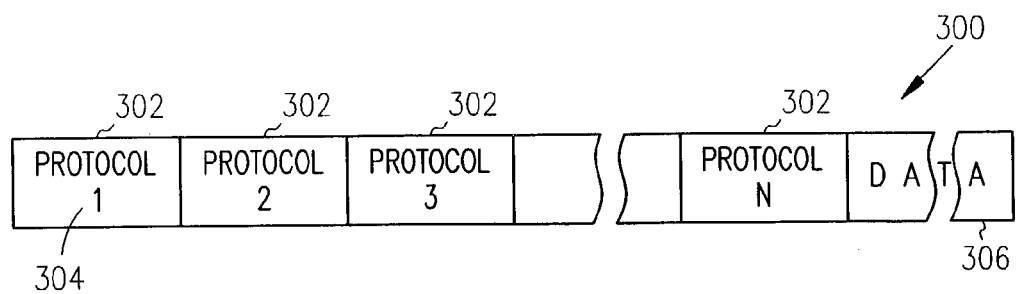
FIG. 3 is a block diagram of an example communication packet in accordance with an embodiment of the present invention.

FIG. 3 is a block diagram of an example communication packet in accordance with an embodiment of the present invention. Packet 300 may be comprised of one or more protocol portions 302 and a data portion 306. Each protocol portion may have a protocol identification field identifying the protocol associated with each portion. In one embodiment, first protocol portion 304 may be a transport layer protocol, including LLT or UDP. In one embodiment, packet 300 may be communicated between nodes of a cluster server system, such as nodes 102 (FIG. 1) of system 100 (FIG. 1), and may be communicated over a private network comprised of private network links 104 (FIG. 1). In one embodiment, sequential packets may be communicated between nodes 102 using more than one link of the private network. Data portion 306 may include the data that is exchanged between nodes, such as the data exchanged between nodes of a cluster server, such as nodes 102 (FIG. 1). Data portion 306 may include, for example, the replicated state information that nodes of a cluster server retain. Data portion 306 may reside above all protocols.

Figure 4A:
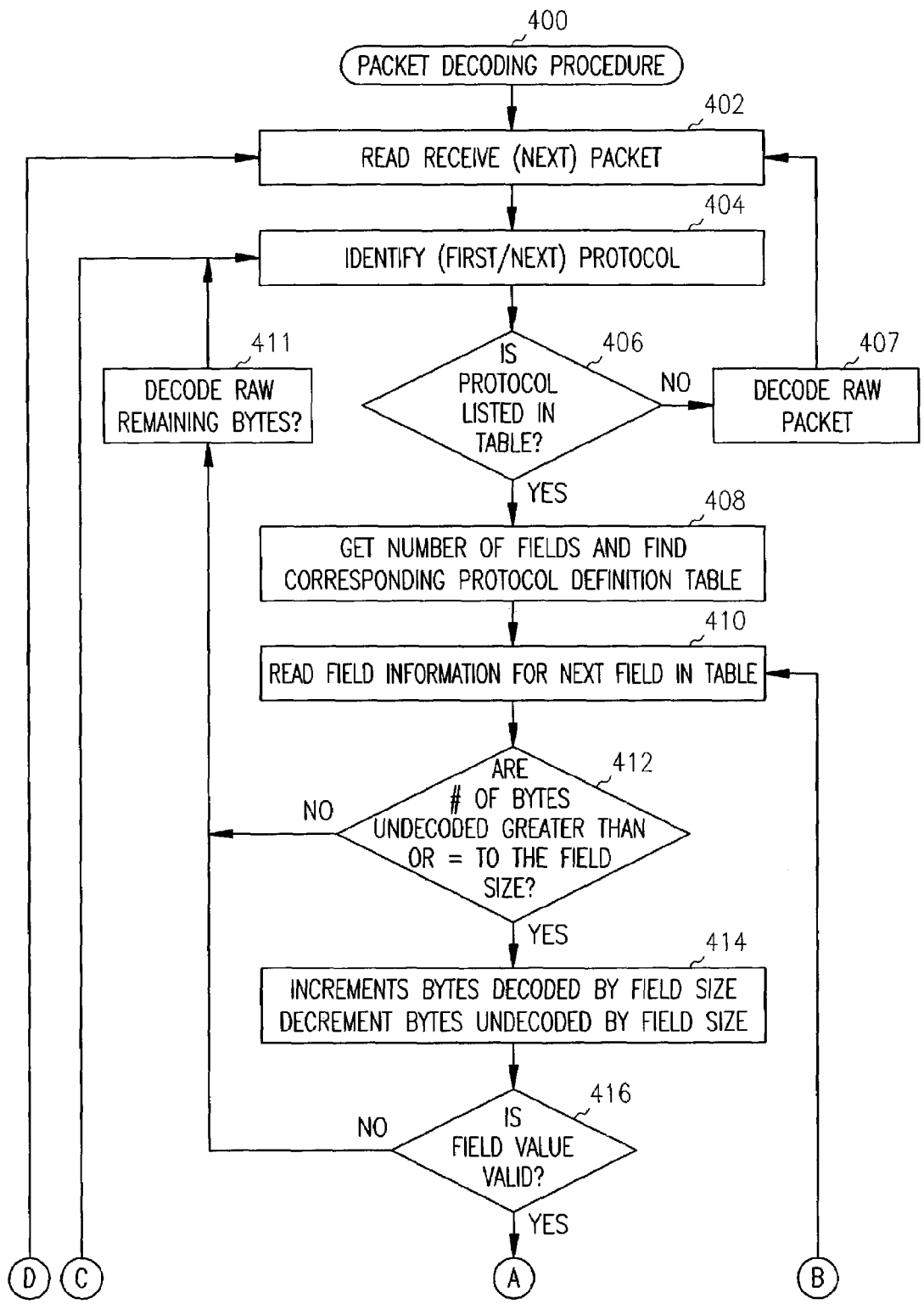
FIGS. 4A and 4B are a flow chart of a packet decoding procedure in accordance with an embodiment of the present invention.
Figure 4B:
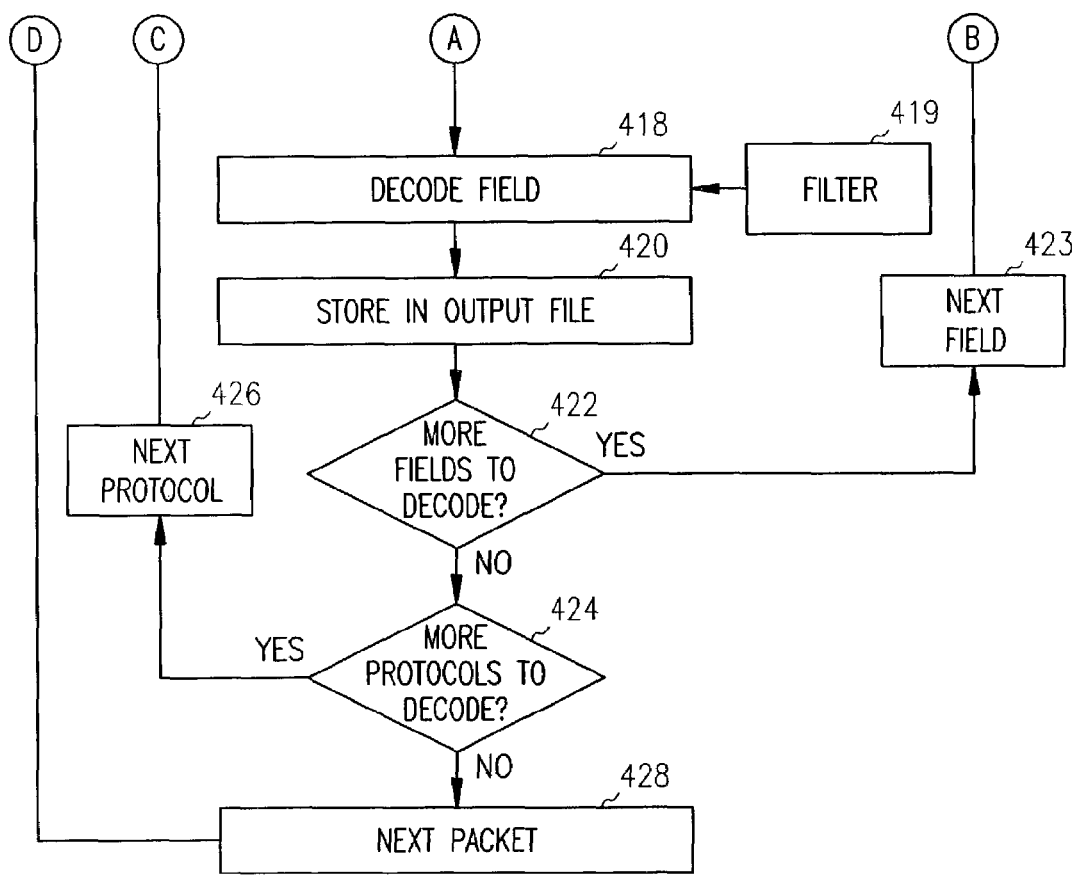

FIGS. 4A and 4B illustrate a flow chart of a packet decoding procedure in accordance with an embodiment of the present invention. Although the individual operations of procedure 400 are illustrated and described as separate operations, one or more of the individual operations may be performed concurrently and nothing requires that the operations be performed in the order illustrated. Procedure 400 may be performed by a digital processing system such as system 200 (FIG. 2), although other systems are also suitable.

In operation 402, a communication packet is read. The packet may be communicated between nodes of a cluster server over a plurality of private network links coupling the nodes of the cluster server. In one embodiment, the packet may be comprised of one or more protocol portions, such as protocol portions 302 (FIG. 3). In one embodiment, a number of bytes of the packet that has been decoded is set to zero, and the number of bytes un-decoded is set to the packet size. In operation 404, a protocol is identified for the packet. The protocol may be a first protocol identified for a first protocol portion of the packet and may be identified from a protocol identification field of the packet.

Operation 406 determines if the protocol identification field is identified in a protocol table, such as protocol table 500 (FIG. 5). The protocol identification field may comprise a unique qualifier, such as element 506 (FIG. 5) uniquely identifying the particular protocol. In one embodiment, the unique qualifier used to identify a protocol in operation 404 may be a unique protocol qualifier that identifies a protocol from its parent protocol. In this embodiment, the unique protocol qualifier may be a combination of given number of bytes at given offset with a given value (i.e. {offset, size, value} combination).

In one embodiment, operation 404 may use a unique qualifier including a combination of given number of bytes at given offset with a given value to identify a protocol. In this embodiment, operation 404 may be performed. When the parent is NULL (see line 1 of table 500) and at packet's offset 12 (either type field), with size 2 bytes matches value '0xcafe', it is the LLT protocol. When the parent is LLT (see line 2 of table 500) and at packet's offset 3 (1 type field), with size 1 byte matches value '0x05'(LLT DATA), it is the GAB protocol. When the parent is GAB (see line 3 of table 500) and at packet's offset 44 (gm type field), with size 1 byte matches value '0x68'(port'h'), it is the HAD protocol. When the parent is LLT (see line 4 of table 500) and at packet's offset 3 (1 type field), with size 1 byte matches value '0x0A'(LLT LMX), it is the LMX protocol.

When the protocol identification field is not identified in the protocol table, the packet (or at least the protocol portion thereof) may not be able to be decoded, and operation 407 may be performed in which entire raw bytes may be decoded, saved to an output file, or discarded. The operation 402 then may be performed to read the next packet.

In operation 406, when the protocol identification field is identified in the protocol table, the packet may be able to be decoded and operation 408 is performed. In operation 408, the number of fields is determined for the identified protocol and a protocol definition table is identified. In one embodiment, the protocol identification table, such as protocol identification table 500 (FIG. 5) may include field 508 to point to a field identification table, such as table 600 (FIG. 6). The field identification table may list the number of fields for each protocol and may have pointers identifying the location of field definition tables for each of the protocols. Example field identification table 600 may identify a number of fields in column 604 for a particular protocol 602, and may identify a location of a field definition table in column 606. FIG. 7 illustrates example field definition table 700 defining information for each field of a protocol.

In operation 410, field information is read for a particular field from the field definition table. Operation 410 may read, for example, field size 704, field offset 706 and field type 708 for a particular field name 702. Although operation 410 is performed for one field, it should be noted that operations 410 through 423 may be performed for each sequential field 702 of a protocol portion of a packet.

Operation 412 determines when the number of bytes un-decoded is greater than or equal to the field size. When the number of bytes un-decoded are greater than equal to the field size, the packet may have one or more valid field and operation 414 is performed. When the number of bytes un-decoded is not greater than or equal to the field size, operation 411 is performed in which the raw-remaining bytes may be decoded, save to an output file, or discarded.

In operation 414, the number of bytes decoded may be increased by the field size and the number of bytes un-decoded may be decreased by the field size. Operation 414 is an optional step and depends on the specific implementation.

Operation 416 determines if the field value is valid and may use a validity field, such as field 710 (FIG. 7), to determine if the value in the field of the packet is a valid value. In one embodiment, the validation function of operation 416 may be performed by sniffer library 212 as previously discussed. If the field is not valid, operation 411 maybe performed.

Operation 418 decodes the field. Operation 418 may use a decode handler such as decode handler 712 (FIG. 7) identified in the field definition for the particular field. The decode handler may indicate a particular format for decoding the field and how to store the decoded field. In one embodiment, the decoding function of operation 418 may be performed by sniffer library 212 as previously discussed. In one embodiment, filtering operation 419 may be implemented as part of the decoding. The filtering may allow a user to pre-select which fields to decode, how to decode the fields and to select their output format. In operation 420, the decoded field may be stored in an output file.

Operation 422 determines when there are more fields of the protocol portion of the packet to decode based on the number of fields determined from the field identification table in operation 408. When there are additional fields to decode, operation 423 performs operations 410 through 422 for each additional field of a protocol portion of the packet.

When operation 422 determines that all fields of a protocol portion of the packet have been decoded, operation 424 is performed. Operation 424 determines if the packet includes additional protocol portions, such as protocol portions 302 (FIG. 3), to decode. When the packet includes additional protocol portions to decode, operation 426 is performed which repeats operation 404 through 424 for a next protocol portion of the packet. Accordingly, fields of a next protocol portion of the packet are decoded and may be stored in an output file.

When operation 424 determines that the packet does not include additional protocol portions, operation 428 is performed which may repeat operations 402 through 426, as required, for a next packet allowing fields of each protocol portion of the next packet to be decoded.

In one embodiment, LLT protocol portions of a packet may have following LLT fields decoded in detail: 1. Major Version, 2. Minor Version, 3. Cluster No., 4. Packet Type, 5. Destination node-id, 6. Source node-id, 7. Port number, 8. Flags, 9. Unused, 10. Length, 11. Destination node's generation no., 12. Bitmap of ready ports sender, 13. Sequence no. Of this packet, 14. Sequence no. Of ACK, 15. Source node's generation no.

In one embodiment, GAB protocol portions of a packet may have following GAB fields decoded in detail: 1. Port id, 2. Source nid, 3. Message type, 4. Flags, 5. Connection generation no., 6. Broadcast sequence no., 7. Payload Size, 8. Destination mask, 9. Reserved.

In one embodiment, HAD protocol portions of a packet may have following HAD fields decoded in detail: 1. Message, 2. Channel, 3. Sender, 4. Number, 5. Sequence, 6. Flags, 7. Version, 8. HAD Data: i. VList—list of all attributes and their values, e.g., message: MSG_GRP_SWITCH, channel: IPM_CHN_IPM (1), sender: 0, number: 0, sequence: 0, flags: MSG_FLAG_TOSYSTEM (0x00000010), version: 0x0001, vlist[1]: "group_1", vlist[2]: "sys-a".

Embodiments of the present invention may also have an option to dump the raw data in a packet as follows:

e.g. Raw Data (132) bytes:

```
01 01 03 05 00 00 00 01 00 07 88 00 00 00 00 84
3a e8 8d d2 80 00 00 81 ff ff ff a9 1c 00 00 03
3a e1 b4 0e f5 b8 3a 40 00 00 00 00 c1 46 00 02
00 00 00 00 20 01 05 01 00 00 00 82 b7 3a 00 02
00 00 00 00 00 00 00 01 00 00 00 00 00 00 00 00
00 00 00 00 07 00 01 00 b7 3a 00 02 00 00 00 83
00 00 00 79 00 00 00 03 00 00 00 00 00 00 00 00
00 00 00 00 00 00 00 00 00 00 00 00 00 00 00 00
00 00 00 00
```

In one embodiment, an option may be provided to dump the packets (along with top most protocol running in that packet) in the buffer in a summary format, which may be configured as follows:

| Pkt # | Link # | Node-id | Cluster-id | Timestamp | Size | Protocol |
|---|---|---|---|---|---|---|
| 1 | 1 | 1 | 15 | 11:10:00.000 | 100 | LLT_ARP_ACK |
| 2 | 1 | 2 | 15 | 11:10:01.000 | 120 | HAD |
| 3 | Public | 3 | 10 | 11:10:02.100 | 100 | GAB |

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer readable memory that may be volatile or non-volatile memory or a combination thereof. Moreover, as used herein, data refers to one or more storage data elements, which can include portions of files, a single file, a file extent, a database, a storage device partition, a volume, sets of volumes and the like. The data need not reside on a single storage device and may span multiple storage devices.

Thus, a method and system that decodes communications between nodes of a network has been described. In one embodiment, a method and system decodes communications of various protocols of packets communicated between nodes of a cluster server. In yet another embodiment, the method and system helps customers analyze problems with cluster server operation. In yet another embodiment, the method and system may serve as a training tool to help persons understand various protocol communications between nodes communicating over a network. In another embodiment, the method and system decodes communications of various protocols of packets communicated between nodes of a cluster server without additional loading of the nodes of the cluster server.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. A method of decoding packets communicated between nodes of a cluster server comprising:

identifying a protocol from a protocol identification field of a communication packet, wherein the protocol is identified in a protocol identification table by reading a unique qualifier present in the protocol identification field of the communication packet, wherein the unique qualifier identifies a value at a location within the communication packet;

identifying a field definition table for the identified protocol, the field definition table defining fields of packets of the identified protocol, wherein the fields of packets of the identified protocol comprise at least a first field and a second field; and decoding each field of the packet in accordance with a respective field decode handler identified for the field in the field definition table, wherein the field decode handler identified for the first field differs from the field decode handler identified for the second field.

2. The method of claim 1 further comprising determining a number of fields for the identified protocol from a field identification table, and wherein the field definition table identifies a corresponding field decode handler corresponding to each of the number of fields identified for the protocol, and wherein the method includes repeating the decoding for the number of fields of at least a portion of the packet in accordance with the corresponding field decode handler.

3. The method of claim 1 wherein the field definition table is one of a plurality of field definition tables, each of the plurality of field definition tables being associated with one of a plurality of protocols, and wherein identifying the protocol in the protocol identification table comprises identifying the protocol from a parent protocol, the unique qualifier identifying a number of bytes at an offset having the value.

4. The method of claim 1 wherein the packets are communicated between the nodes over a plurality of private network links coupling the nodes of the cluster server, and wherein the packets are comprised of one or more protocol portions, wherein each protocol portion having fields that are arranged in accordance with one of a plurality of protocols identified by a unique qualifier in the protocol identification field of each of the protocol portions.

5. The method of claim 4 wherein identifying the protocol includes identifying a first protocol for a first protocol portion of the packet, and wherein identifying a first field definition table includes identifying a field definition table for the first protocol, and wherein decoding comprises decoding fields of the first protocol portion of the packet, and wherein the method further comprises:
identifying a second protocol for a second protocol portion of the packet;
identifying a second field definition table for the second protocol; and
decoding fields of the second protocol portion of the packet in accordance with field decode handlers for fields of the second protocol portion of the packet identified in the second field definition table.

6. The method of claim 5 wherein when the packet has remaining protocol portions, the method includes repeating the identifying and decoding steps for the remaining protocol portions of the packet using other definition tables for the remaining protocol portions for the packet.

7. The method of claim 1 further comprising storing the decoded field in an output file for subsequent analysis.

8. The method of claim 1 further comprising applying a filter to the decoding to decode predetermined fields of the packet and refrain from decoding other predetermined fields of the packet, wherein the predetermined fields are specified in a user preference file.

9. The method of claim 1 wherein the decode handler utilizes a user preferences file for decoding particular fields of the packet.

10. The method of claim 1 further comprising refraining from decoding fields of packets identified by the protocol identification field as being of a predetermined protocol.

11. A packet decoding system to decode packets communicated between nodes of a cluster server, the system comprising:
a network interface to read communication packets communicated over a plurality of private network links coupling the nodes of the cluster server;
a memory to store at least a field definition table associated with each protocol of a plurality of protocols, the field definition table defining fields and identifying field decode handlers for fields of the associated protocol, wherein the fields comprise at least a first field and a second field, and wherein the field decode handler identified for the first field differs from the field decode handler identified for the second field; and
a processing element to identify a protocol from a protocol identification field of a communication packet, to identify a field definition table for the identified protocol, and to decode each field of the packet in accordance with the respective field decode handler identified for the field in the field definition table;
wherein the protocol is identified in a protocol identification table by reading a unique qualifier present in the protocol identification field of the communication packet, wherein the unique qualifier identifies a value at a location within the communication packet.

12. The system of claim 11 further wherein the network interface reads packets that are communicated between the nodes over the plurality of private network links coupling the nodes of the cluster server, and wherein the packets are comprised of one or more protocol portions, wherein each protocol portion has fields that are arranged in accordance with one of a plurality of protocols, each portion identified by the unique qualifier in the protocol identification field to identify the protocol from a parent protocol, the unique qualifier identifying a number of bytes at an offset having the value.

13. The system of claim 12 wherein the processing element identifies a second protocol from a second protocol identification. field of a. second protocol portion of the communication packet, identifies a second field definition table for, the second identified protocol, and decodes a field of the second protocol portion packet in accordance with the field decode handler for at least one field identified in the second field definition table.

14. The system of claim 11 wherein the memory further stores a field identification table, wherein the processor determines a number of fields for the identified protocol from the field identification table, and wherein the field definition table identifies a corresponding field decode handler corresponding to each of the number of fields identified for the protocol, and wherein the processor repeats the decoding for the number of fields of at least a portion of the packet in accordance with the corresponding field decode handler.

15. The system of claim 11 wherein the field definition table is one of a plurality of field definition tables, each field definition table being associated with one of a plurality of protocols, and wherein the processor, when identifying the protocol, determines if the protocol is identified in a protocol identification table by reading a unique qualifier present in the protocol identification field.

16. The system of claim 11, wherein the decoded field is stored in an output file for subsequent analysis,
wherein the processor applies a filter to decode preselected fields of the packet and refrains from decoding other preselected fields of the packet, the preselected fields being specified in a user preference file.

17. An article comprising a storage medium having stored thereon instructions, that when executed by a computing platform, result in:
identifying a protocol from a protocol identification field of a communication packet, wherein the protocol is identified in a protocol identification table by reading a unique qualifier present in the protocol identification field of the communication packet, wherein the unique qualifier identifies a value at a location within the communication packet;
identifying a field definition table for the identified protocol, the field definition table defining fields of packets of the identified protocol, wherein the fields of packets of the identified protocol comprise at least a first field and a second field; and
decoding each field of the packet in accordance with a respective field decode handler for at least one field identified in the field definition table, wherein the field decode handler identified for the first field differs from the field decode handler identified for the second field.

18. The article of claim 17 wherein the instructions, when, executed by the computing platform, further result in determining a number of fields for the identified protocol from a field identification table, and wherein the field definition table identifies a corresponding field decode handler corresponding to each of the number of fields identified for the protocol, and repeating the decoding for the number of fields of at least a portion of the packet in accordance with the corresponding field decode handler, and wherein the field definition table is one of a plurality of field definition tables, each of the plurality of field definition tables being associated with one of a plurality of protocols, and wherein identifying the protocol in the protocol identification table comprises identifying the protocol from a parent protocol, the unique qualifier identifying a number of bytes at an offset having the value.

19. The article of claim 17 wherein the packets are communicated between the nodes over a plurality of private network links coupling the nodes of the cluster server, and wherein the packets are comprised of one or more protocol portions, wherein each protocol portion has fields that are arranged in accordance with one of a plurality of protocols identified by a unique qualifier in the protocol identification field, and wherein the instructions, further result in:

identifying a first protocol for a first protocol portion of the packet, and wherein identifying a field definition table includes identifying a first field definition table for the first protocol and wherein decoding comprises decoding fields of the first protocol portion of the packet;

identifying a second protocol for a second protocol portion of the packet;

identifying a second field definition table for the second protocol; and decoding fields of the second protocol portion of the packet in accordance with field decode handlers for fields of the second protocol portion of the packet identified in the second field definition table.

20. The article of claim 17 wherein the article is a computer readable medium, and wherein the instructions, when executed by the computing platform, further result in:

storing the decoded field in an output file for subsequent analysis; and applying a filter to the decoding to decode predetermined fields of the packet and refrain from decoding other predetermined fields of the packet, wherein the predetermined fields are specified in a user preference file.

* * * * *